United States Patent [19]

Schrenk

[11] Patent Number: 4,910,707
[45] Date of Patent: Mar. 20, 1990

[54] EEPROM WITH PROTECTIVE CIRCUIT

[75] Inventor: Hartmut Schrenk, Haar, Fed. Rep. of Germany

[73] Assignee: Siemens Aktiengesellschaft, Berlin and Munich, Fed. Rep. of Germany

[21] Appl. No.: 304,873

[22] Filed: Jan. 30, 1989

Related U.S. Application Data

[63] Continuation of Ser. No. 780,377, Sep. 26, 1985, abandoned.

[30] Foreign Application Priority Data

Sep. 27, 1985 [DE] Fed. Rep. of Germany ....... 3435495

[51] Int. Cl.[4] .................. G11C 13/00; G11C 11/40
[52] U.S. Cl. .................... 365/185; 365/106; 307/310
[58] Field of Search ............... 365/131, 53, 215, 106, 365/109, 110, 112, 115, 182, 185, 105; 307/310, 311, 317 R

[56] References Cited

U.S. PATENT DOCUMENTS

| | | | |
|---|---|---|---|
| 3,551,761 | 12/1970 | Ruoff | 365/115 |
| 3,696,250 | 10/1972 | Weimer | 365/115 |
| 3,721,963 | 3/1973 | Tenne | 365/115 |
| 4,499,557 | 2/1985 | Holmberg | 365/163 |
| 4,608,672 | 8/1986 | Roberts et al. | 365/105 |
| 4,612,629 | 9/1986 | Harari | 365/185 |
| 4,677,742 | 7/1987 | Johnson | 365/163 |
| 4,714,901 | 12/1987 | Jain et al. | 307/310 |
| 4,722,822 | 2/1988 | Thai et al. | 365/105 |
| 4,789,964 | 12/1988 | Krilic | 365/115 |

OTHER PUBLICATIONS

Journal "Electronics" Feb. 28, 1980, pp. 113–117.
Patent Abstract of Japan vol. 6, No. 188, Jun. 18, 1982.

Primary Examiner—Terrell W. Fears
Attorney, Agent, or Firm—Herbert L. Lerner; Laurence A. Greenberg

[57] ABSTRACT

A monolithically integrated MOS circuit includes a memory area having electrically programmable storage cells (E$^2$PROM) with outputs, a potential source, at least one blocking circuit for connecting at least one of the outputs to the potential source, and a radiation sensitive sensor connected to the blocking circuit for controlling the connection of the outputs to the potential source.

6 Claims, 2 Drawing Sheets

EEPROM WITH PROTECTIVE CIRCUIT

This application is a continuation of application Ser. No. 780,377, filed Sept. 26, 1985, now abandoned.

The invention relates to a monolithically integrated MOS circuit with a storage area of electrically programmable storage cells ($E^2$PROM).

A memory device with electrically programmable storage cells is known from the journal "Electronics", Feb. 28, 1980, pages 113 to 117. Each of the memory cells includes a control and a storage gate (floating gate). An electron displacement from or into the floating gate due to a tunnel effect is brought about by applying a positive or negative programming voltage.

The content of the memory can be subjected to analysis by means of an electro-optical potential probe method. This is done by sampling the charge state of the storage cells by electron rays or X-rays and by examination of the potential contrast. Conclusions as to the programming state can be drawn directly or indirectly from this analysis.

However, there are applications for memory circuits, in which the disclosure of the memory content to unauthorized persons must be prevented. Security and access systems, accounting and recording systems and debit or credit systems, in which so-called chip cards are used, are examples of applications therefor. Individual data which are checked prior to each application of the card and which are to prevent unauthorized use of the card, are stored on each of these cards. The possibility of an analysis of the memory content with fraudulent intent can therefore jeopardize the reliability of the system in question.

It is accordingly an object of the invention to provide an MOS circuit with an $E^2$PROM, which overcomes the hereinaforementioned disadvantages of the heretofore-known devices of this general type, and which has a memory that is protected from electro-optical analysis.

With the foregoing and other objects in view there is provided, in accordance with the invention, a monolithically integrated MOS circuit, comprising a memory area having electrically programmable storage cells ($E^2$PROM) with outputs, a potential source, at least one blocking circuit for connecting at least one of the outputs to the potential source, and a radiation sensitive sensor connected to the blocking circuit for controlling the connection of the outputs to the potential source.

The invention is based on the provision, that if radiation is employed, at least some of the storage cells are connected to a defined potential on the output side, independently of the charge state of the storage cells, and the stored information is therefore not recognizable. This is achieved by integrating one or more radiation-sensitive sensors in the area surrounding the storage cells and by using the output signal thereof for the defined fixing of the column voltage present at the memory outputs. Upon irradiation, the output signal of the sensors is changed and the sensors have an influence on the level of the column lines. The column line potential then becomes independent of the charge state of the storage cell. The memory content is therefore not changed.

The invention is also advantageous because sensors which are pn-diodes can be incorporated into the generally used n-channel double silicon silicone-gate technology, by means of standardized manufacturing steps.

In accordance with another feature of the invention, the blocking circuit includes a transistor having a control path connected between the at least one output and the potential source, and a control input connected to the sensor.

In accordance with an added feature of the invention there are provided additional sensors and additional blocking circuits separate from but connected to the sensors, at least the sensors being geometrically i.e. spatially distributed in the memory area.

In accordance with an additional feature of the invention there is provided a logic gating connecting the outputs of a plurality of the sensors to at least one of the blocking circuits.

In accordance with a further feature of the invention the logic gating exhibits amplifier and Schmitt trigger properties.

In accordance with a concomitant feature of the invention, there is provided a passivating layer completely covering the memory area and the sensor or sensors.

The MOS circuit further includes inverters, wherein at least some of the logic gates and inverters are connected as Schmitt triggers.

Other features which are considered as characteristic for the invention are set forth in the appended claims.

Although the invention is illustrated and described herein as embodied in an MOS circuit with an $E^2$PROM, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
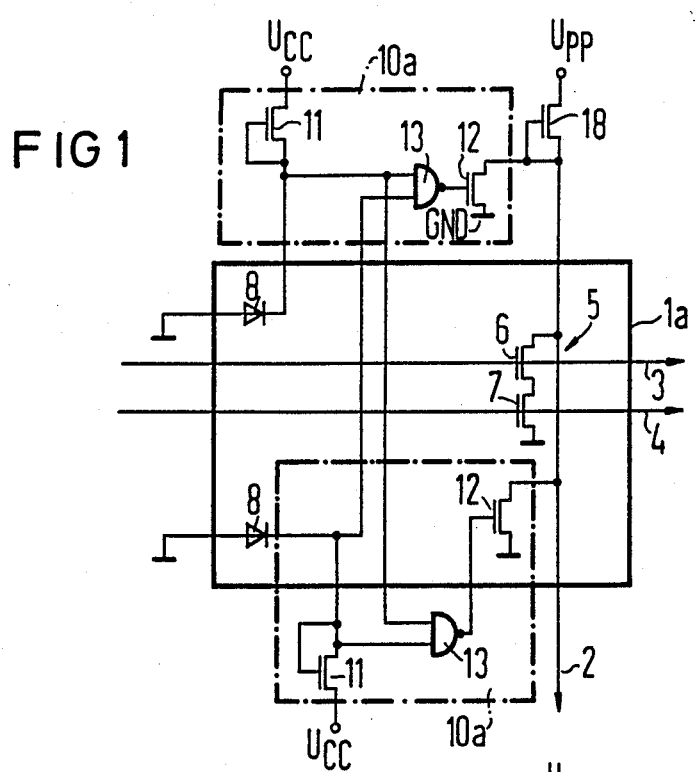
FIGS. 1 and 2 are schematic circuit diagrams each showing a storage cell protected in accordance with the invention.

Referring now to the drawings in detail and first, particularly, to FIG. 1 thereof, there is seen a memory area 1a with a multiplicity of storage cells 5 which are disposed in matrix-fashion. Each storage cell 5 is formed of a selection transistor 6 and a storage transistor 7 of the floating-gate type, connected in series. All of the selection transistors 6 of a row can be addressed by a selection line 3 and all of the storage transistors 7 of a row can be addressed by a programming line 4. The storage cells 5 are read-out column by column by a column line 2 which is connected to a first supply voltage Upp through a load transistor 18.

The storage area 1a is also equipped with radiation-sensitive sensors 8 which, in the embodiment shown, are formed of two photo diodes 8. Blocking circuits 10a are connected between the diodes 8 and at least one column line 2. If addressed by the sensors, the blocking circuits 10a suppress all read-out processes on the corresponding column line 2. In the regular operating condition, i.e., without the storage area 1a being exposed to radiation, the diodes 8 are cut off by a second supply voltage $U_{cc}$ of a few volts and they are weakly conducting. The output voltages of the diodes 8 are therefore at a logical 1 because a load transistor 11 is of the self-conducting or self-latching type. The action of light or radiation causes pairs of charge carriers to be generated along a pn-boundary of the diodes 8; this causes a diode current to flow and connect the output voltages of the sensors to logical zero.

The output signal of each diode 8 is fed in an inverted manner to the control gate of at least one further self-latching transistor 12 which is connected to the column line 2. Upon the incidence of radiation, these transistors 12 are given a positive control voltage and become conducting. The transistors switch the column potentials to logic zero e.g. ground as long as the radiation persists. One or more of the further transistors 12 are associated with each column line 2. If several diodes 8 or further transistors 12 are disposed in the storage area, the output signals of all of the diodes 8 are inverted by NAND gates 13 and are interconnected and fed to the further transistors 12. Advantageously, the inverters also have an amplifier and/or a Schmitt trigger function.

Figure 2:
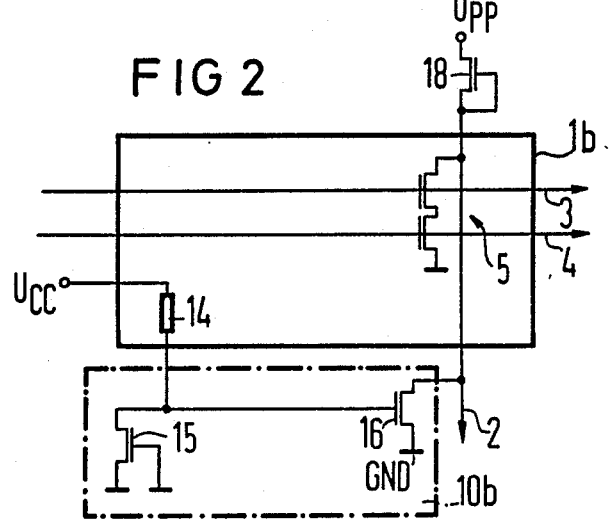

In the embodiment of FIG. 2 which has a storage area 1b, the sensor is in the form of a photo-resistor 14 and the blocking circuit 10b is in the form of a transistor 16 addressed by a self-conducting transistor 15. As long as the photo-resistor 14 is not exposed to radiation, it is weakly conducting. In this condition, the control input of the transistor 16 is pulled to ground and blocked by the self-conducting transistor 15. With hard irradiation and photo-conduction, the control input of transistor 16 is connected to a supply voltage $U_{cc}$ through the photo-resistor 14 and is switched into conduction, the column line 2 being pulled to ground by its controlled path. The photo-resistor 14 can also be provided with a standard technique as a polysilicon-path resistor.

Photoresistors, for instance, are also suitable sensors.

In order to achieve a suppression of the read-out processes even if the storage area 1a, 1b is partially irradiated, several sensors (photo-diodes 8, photo-resistor 14) and the corresponding blocking circuits are provided and are wired independently of each other, as shown by way of example in FIG. 1. The sensors are geometrically distributed within the storage area 1a, 1b. In this case, several sensors act through a logic gating on the blocking circuit 10a, 10b and the column line 2 through the two NAND gates 13, in the embodiment according to FIG. 1.

Figure 3:
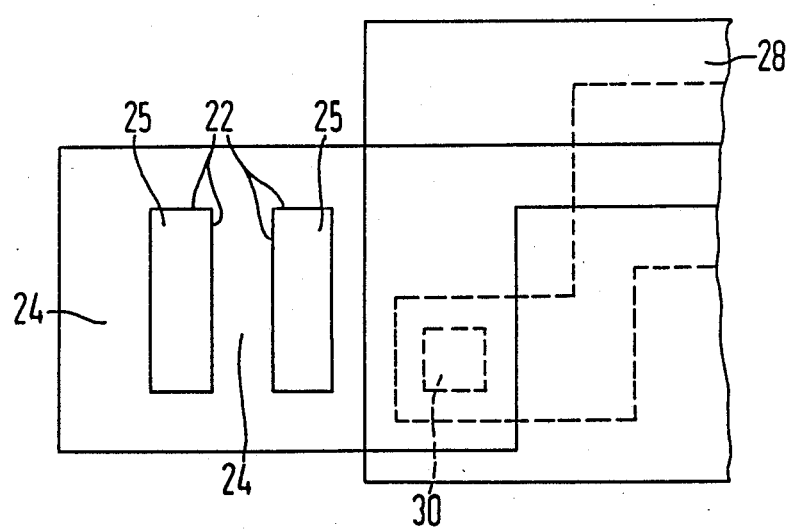
FIG. 3 is a fragmentary, diagrammatic, top-plan view of a storage cell.
Figure 4:
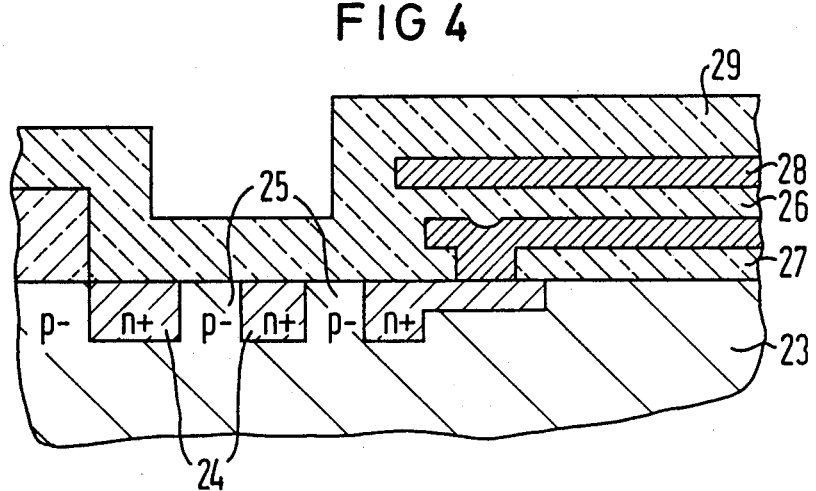
FIG. 4 is a fragmentary, cross-sectional view of the storage cell according to FIG. 3.

FIGS. 3 and 4 show the construction of a diode 8 and the corresponding load transistor 11. The fabrication of a pn-diode can be incorporated into the generally used n-channel double silicon silicon-gate technique, by means of standardized manufacturing steps. In order to increase the radiation sensitivity, such a diode advantageously includes a finger or strip i.e. elongate structure with an increased length of the pn-boundary 22. According to the illustrated embodiment, zones 24 which are n+ doped with a first mask are generated on a p− substrate 23 by means of conventional source-drain doping. The p-regions 25 of the photo-diode are protected from the source-drain electrode and retain the doping type of the base material.

The p-regions 25 of the cathode of the photo-diodes are acted upon by ground potential through the substrate 23. A silicon oxide layer 26 is removed above the p-regions 25 of the diode. The entire surface of the device is sealed from the outside by a silicon nitrite layer 29. Furthermore, the leads of the load transistor 11 and all leads concerning the blocking circuit 10a, 10b, are connected together and are connected through a silicon layer 27 and so-called buried contacts 30. They are shielded from the outside by a further polysilicon nitrite layer 29 located on top thereof.

The foregoing is a description corresponding in substance to German Application P 34 35 495.6, dated Sept. 27, 1984, the International priority of which is being claimed for the instant application, and which is hereby made part of this application. Any material discrepancies between the foregoing specification and the aforementioned corresponding German application are to be resolved in favor of the latter.

I claim:

1. Monolithically integrated MOS circuits, comprising a memory area having electrically programmable storage cells ($E^2PROM$) with read-outs, a potential source connected to the circuit, at least one blocking circuit for connecting at least one of said read-outs to said potential source, and at least one radiation sensitive sensor connected to said blocking circuit for activating said connection of said read-outs to said potential source in response to radiation, disposed in said memory area wherein said blocking circuit includes a transistor having a control path connected between said at least one read-out and said potential source, and a control input connected to said sensor.

2. MOS circuit according to claim 1, including a plurality of radiation-sensitive sensors, and a plurality of blocking circuits spaced from and connected to said radiation-sensitive sensors, at least said radiation-sensitive sensors being spatially distributed in said memory area.

3. MOS circuit according to claim 2, including logic gates connecting said read-outs of a plurality of said radiation-sensitive sensors to at least one of said blocking circuits.

4. MOS circuit according to claim 3 further including inverters, wherein at least some of said logic gates and inverters are connected as Schmitt triggers.

5. MOS circuit according to claim 1, including a silicon nitrite sealing layer completely covering said memory area and said sensor.

6. MOS circuit according to claim 2, including a silicon nitrite sealing layer completely covering said memory area and said sensors.

* * * * *